F. W. MEYER.
RECTIFYING SYSTEM.
APPLICATION FILED JUNE 20, 1914.
1,253,267.
Patented Jan. 15, 1918.
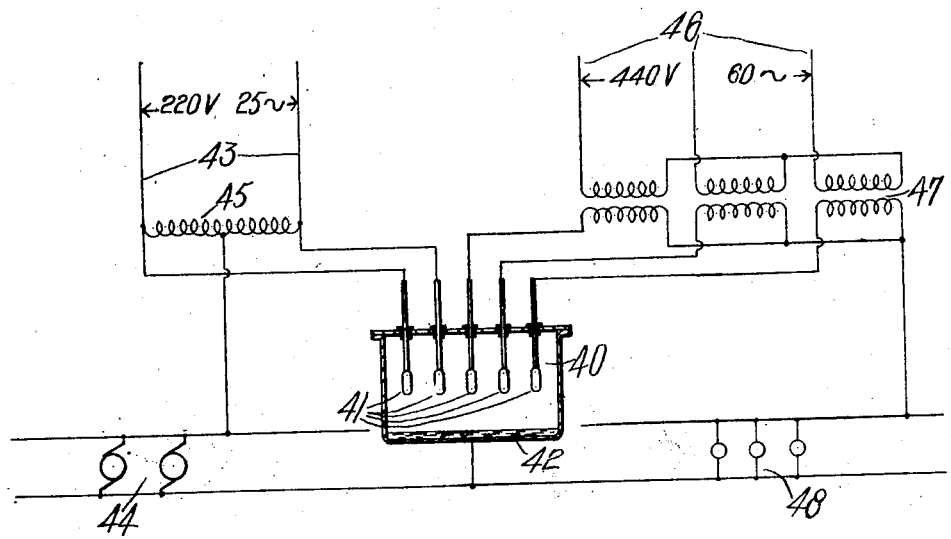
WITNESSES:
Clarence E. Myers.
D. C. Davis
INVENTOR
Friedrich W. Meyer.
BY
Chuley G. Carr
ATTORNEY

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

RECTIFYING SYSTEM.

1,253,267.  Specification of Letters Patent.  Patented Jan. 15, 1918.

Application filed June 20, 1914. Serial No. 846,366.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Rectifying Systems, of which the following is a specification.

My invention relates to systems for the conversion of alternating current into direct current, and it has for its object to provide means whereby energy from a plurality of alternating-current circuits of different voltages and of different frequencies may be rectified and supplied to a like number of direct-current circuits having corresponding voltages, all of such rectification taking place in a single rectifying device, preferably of the vapor arc type.

The single figure of the accompanying drawing is a diagrammatic view of a combined circuit embodying my invention.

In my copending application Serial No. 846,364, filed June 20, 1914, and assigned to Westinghouse Electric & Manufacturing Company, I have disclosed a system whereby energy from a plurality of alternating current circuits of different frequencies and phases is brought to a common alternating-current voltage, passed through a rectifying device and supplied to a single direct-current consumption circuit. This inventive idea is capable of extension in that I have found that not only is it possible to rectify current from a plurality of alternating circuits of the same voltage in one rectifier but I have found that it is also possible to rectify current from a plurality of alternating current circuits of different voltages in one rectifier, provided the energy from each alternating current circuit is supplied to a separate direct-current consumption circuit of corresponding voltage.

In the drawing, a rectifier 40, preferably of the metallic container mercury-vapor type is provided with a plurality of anodes 41 and with a common cathode 42. Two of the anodes are connected, respectively, to the mains 43 of a single-phase alternating circuit operating at, for example, 220 volts and 25 cycles. Current flow takes place from each of these anodes in succession to the common cathode and, through a load circuit 44 to an artificial neutral created in the system 43 by a compensating coil 45. The load circuit 44 will then be supplied with direct current at a voltage somewhat less than one half the alternating-current voltage, for example, 100 volts. Three other anodes in the rectifier 40 are connected, respectively, to a three-phase alternating circuit 46 operating, for example, at 440 volts and 60 cycles. A transformer 47 may be introduced into the connection in order to give a neutral point and may, if desired, have merely a one-to-one ratio. The current, passed into the rectifier from the system 46, flows from the common cathode through a load circuit 48 to the neutral point in the secondary winding of the transformer 47. The load circuit 48 will be supplied with direct current at a voltage of somewhat less than one half the alternating voltage or substantially 210 volts.

It would seem that there might be reverse arcing or current interchange between the systems of different voltage but this will not be the case so long as the negative electrode reluctance of none of the anodes is broken down, as will appear from the following consideration. The cathode 42, electrically connected to each system, forms a connecting link, insuring that this point in each system is always of the same potential. The voltage drop between the anodes and the cathode is independent of the voltage being rectified but is a function of the vapor pressure and temperature which is substantially the same in all parts of the rectifier. Hence, all the anodes will, when operating, be at the same potential for example, 15 volts, above the potential of the cathode and there will be no tendency for arcing therebetween when active. All other points in the systems being disconnected, there will, in normal operation, be substantially no interchange of power between the systems.

I claim as my invention:

1. The combination with a plurality of alternating-current circuits of independent frequencies, of a like number of direct-current load circuits, and common means for rectifying alternating current from each of the alternating-current circuits and for transmitting the rectified current to a corresponding direct-current circuit load.

2. The combination with a plurality of alternating-current circuits of differing voltage and frequencies, of a separate direct-current load circuit associated with each of said alternating-current circuits, and a common rectifying device for rectifying current from each of the alternating-current circuits and for transmitting current to each of the direct-current load circuits.

3. The combination with an evacuated container, of a plurality of anodes therein, a vaporizable reconstructing cathode therein, an alternating-current circuit connected to certain of the anodes, an independent alternating-current circuit of different frequency connected to certain other of the anodes, and connections from the cathode to each of a plurality of direct-current load circuits, one of which is associated with each of the alternating-current circuits.

4. The combination with an evacuated container, of a plurality of anodes therein, a vaporizable reconstructing cathode therein, an alternating-current circuit connected to certain of the anodes, an independent alternating-current circuit having a different voltage and frequency from that of the first alternating-current circuit connected to certain other of the anodes, and connections from the cathode to each of a plurality of direct-current load circuits, one of which is associated with each of the alternating-current circuits and has a voltage impressed thereon corresponding to the voltage in the alternating-current circuit associated therewith.

5. The combination with a vapor rectifier, of means for simultaneously maintaining a plurality of rectifying arcs therein, certain of said arcs rectifying current of different voltage and frequency from certain other of said arcs.

6. The combination with a vapor rectifier, of a plurality of direct-current circuits supplied therefrom, the total electromotive force applied to one of said circuits being greater and of different frequency than the total electromotive force applied to another of said direct-current circuits.

7. The combination with a pair of rectifying systems having different operating voltages and frequencies, of a common cathode operating in the rectification of each system.

8. In a vapor rectifier system, the combination with a plurality of alternating-current systems of different voltages, of a rectifier embodying a plurality of anodes and a cathode, connections from each of said anodes to a main of each of said systems, respectively, and a connection from said cathode to another main in each of said systems, the difference of potential between each anode and the cathode being substantially equal when the anodes are positive with respect to the cathode, and the difference of potential being greater between one anode and the cathode than between the other anode and the cathode when the anodes are negative with respect to the cathode.

In testimony whereof, I have hereunto subscribed my name this 19th day of June, 1914.

FRIEDRICH W. MEYER.

Witnesses:
D. C. DAVIS,
B. B. HINES.